Patented Apr. 2, 1929.

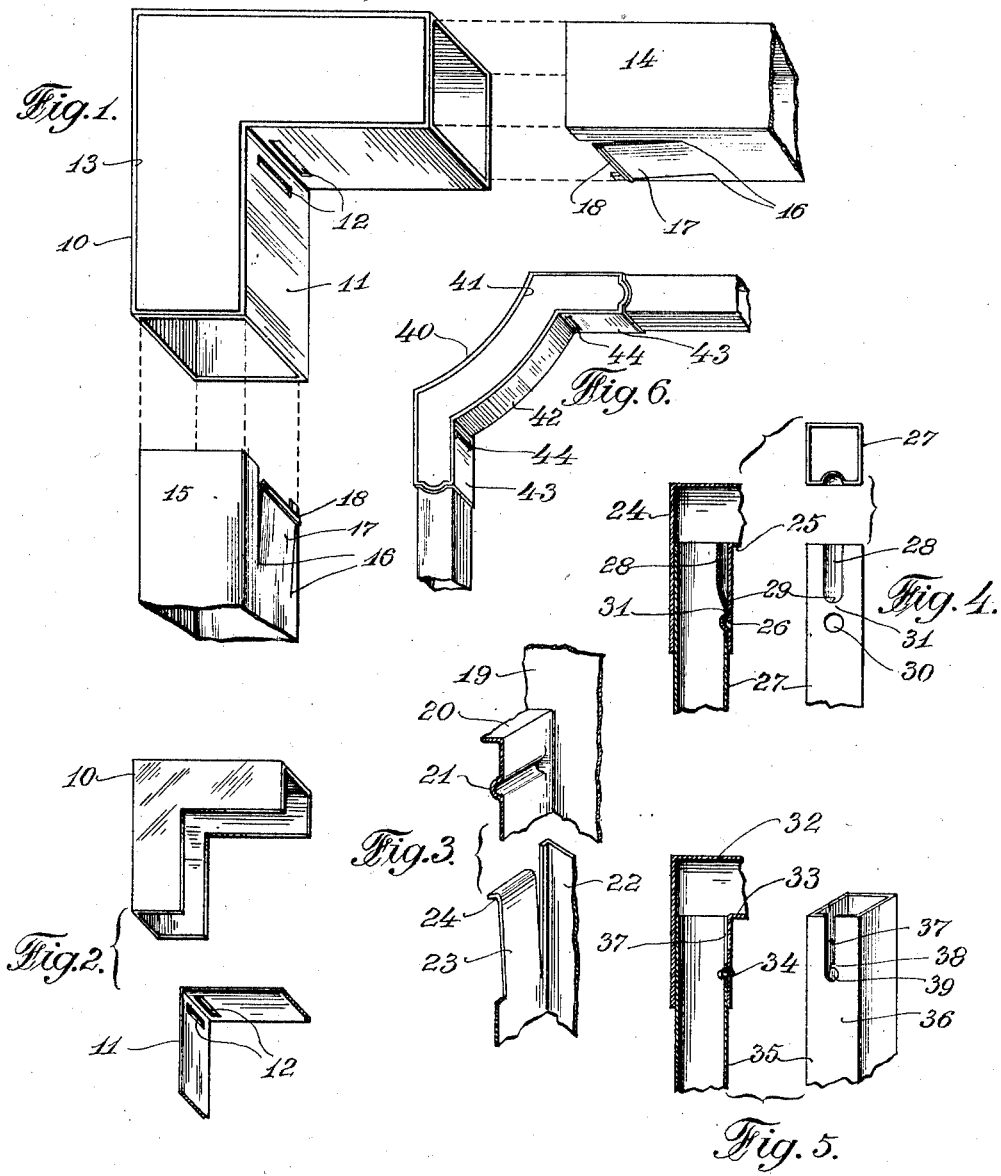

1,707,230

UNITED STATES PATENT OFFICE.

LEO LOWY, OF NEW YORK, N. Y.

BED-FRAME CONNECTION.

Application filed March 25, 1925. Serial No. 18,106.

This invention relates to frame joints which may be termed temporary weldless joints designed particularly for hollow frames.

The fabrication of bedsteads has undergone a reformation in so far that instead of wood, hollow metal is beginning to be used generally.

Because of the disadvantage encountered with brass frames the trend developed in the direction of using steel frames which are considerably stronger, less expensive and more durable. The disadvantage encountered with fabricating steel frames is the necessity of employing the welding process in uniting the various parts which process not only is extremely expensive in itself, but necessitates the cleaning of the welded joint so as to produce a smooth surface which afterwards may be polished or painted.

The handling of cumbersome frames thus welded together is not only expensive but difficult. One of the distinct disadvantages connected with steel bedsteads is a matter of storage after fabrication.

My method of producing bedsteads or rather the connections between the frame members of such bedsteads is novel and simplifies not only the manufacture but also allows for storing of parts in an unassembled condition.

One of the prime objects of my invention is to provide a simple, inexpensive and at the same time decorative joint between frame members which I might term a temporary joint. It is designed primarily for the purpose of temporary assembling the frame parts which are then finally held together by stay rods which form a permanent connection for the frame members.

Another object of my invention is to provide within such joints and at the ends of the frame members, means for locking the latter together with said joints.

The foregoing and further objects will be more fully apparent from the accompanying drawing forming part of this specification and the following description explaining the various features of my invention.

Referring to the drawings,

Figure 1 is a perspective view of a corner joint ready to receive two frame members.

Figure 2 is a detailed view of the corner joint showing the parts of which it consists.

Figure 3 shows a modified form of the portion of a corner joint and a portion of a frame member end.

Figures 4 and 5 represent two modifications of a corner joint with their respective frame members and, Figure 6 illustrates a modified form of a corner joint.

In Figures 1 and 2, numeral 10 denotes the outer shell of a corner, while numeral 11 indicates the inner portion of closure thereof, which is permanently united with the outer shell.

It will be observed that near the bend of the inner portion 11 there are provided apertures 12, the purpose of which will be explained presently. The outer surface of the shell portion is preferably ornamented either by embossing it or attaching thereto an ornamented design. The portion in which that design is usually provided is marked by an outline 13.

Since it is understood that any kind of design may be furnished with the shell, the space within the outline 13 is left blank.

At the right and at the lower end of the corner in Figure 1 there are shown hollow frame members 14 and 15. At the end of each frame member one face thereof is sheered in two places indicated at 16 so that a resilient blade 17 is formed, the end of which is bent over as indicated at 18 and is adapted to engage or register with the punched out openings 12 of the angle joint when the frame members are in telescopic relation therewith.

It will be noted that the frame members 14 and 15 have a butt end, that means that they are not cut on the bevel as becomes necessary when the frame members would be joined together by a welding process. This feature alone represents a considerable saving not only in labor but also in material, since the frame members shipped from the mill have straight faces and do not need to be further fabricated, except cutting them to desired length.

The sheering and bending operation to produce the resilient blade 17 is comparatively simple and inexpensive as no particular care need to be taken beyond properly placing the frame ends into the punch press. When frame members 14 and 15 are inserted into the ornamented angle joint their blades automatically snap into apertures 12 and the connection is made.

As will be seen from Figure 2, I preferably construct the corner joint from two parts, the outer shell 10 being made by a punch operation and the inner portion 11 being joined thereto by a simple spot welding or riveting process. The quantity production of such corners may be made so inexpensive that their cost will hardly be of any consideration.

Figure 3 illustrates a modified form of the snap joint where numeral 19 denotes part of the outer shell of the corner joint, while numeral 20 indicates the inner portion thereof which is provided with a transverse depression 21 in place of the formerly used punch holes 12.

Numeral 22 indicates the frame member from which is formed the resilient blade 23 provided with a hook-shaped end 24, which latter engages depression 21 when the frame member is inserted into the corner joint.

A somewhat modified arrangement will be seen in Figure 4 in which numeral 24' indicates the outer shell of the corner joint and 25 the inner portion thereof. The latter portion is provided with a semi-spherical depression 26. At one face of the frame member 27 there is provided a groove 28 which is gradually diminishing in depth until it reaches a point 29 where it becomes of the same height as the surrounding surface. The aperture 30 is provided in the direction of groove 28, and between the point 29 and the aperture 30 there is a bridge 31.

When the frame member 27 is inserted into the corner joint the groove 28 permits an unrestricted passage of the frame member into the corner joint until depression 26 comes to bear against the surface of groove 28. At this moment the frame member 27 is rigidly forced into the angle joint and by so doing depression 26 forces the face of the frame member temporarily to be out of the way until the depression is able to register with aperture 30. In this position the frame member 26 is securely held within the angle joint. A similar construction is shown in Figure 5 where numeral 32 denotes the outer shell of the hollow corner member, while 33 indicates the inner portion thereof. Instead of the depression 26 as shown in Figure 4, the pin or rivet 34 is provided.

The frame member 35 has at its inner face 36 a slot 37 permitting the unrestricted insertion of the member into the corner joint. Near the end of the slot 37 there is provided a little tooth or notch 38, which has to give way temporarily when passing pin or rivet 34. The moment however this tooth 38 is passed, the rivet will provide a firm hold for the frame member by engaging the end portion 39 of the slot.

In Figure 6 there is shown a modified form of a corner design in which numeral 40 denotes the outer shell of the corner joint which in this case in itself is of a more decorative effect. Its decorative qualities may be enhanced by means of ornamentations within the outline marked 41. The inner portion 42 of the joint extends into end members 43 which are provided with depressions 44 described in connection with Figure 3.

While I have shown and described a few specific forms of my invention be it understood that changes in design and construction may be made without departing from the broad scope of my idea for which I claim:—

The combination with a bed frame structure composed of hollow members having substantially rectangular cross sections, of a bed frame corner joint, composed of hollow, symmetrically arranged legs adapted to receive the ends of said frame members, the inner wall of each of said hollow legs provided with a slot, the ends of said frame members provided at their inner walls with substantially hook-shaped extensions formed from the material of the members and adapted to engage said slots provided at the inner walls of said corner member, when telescopingly engaging and fully inserted into the latter.

Signed at New York in the county of New York and State of New York this 19th day of March, A. D. 1925.

LEO LOWY.